2,542,460

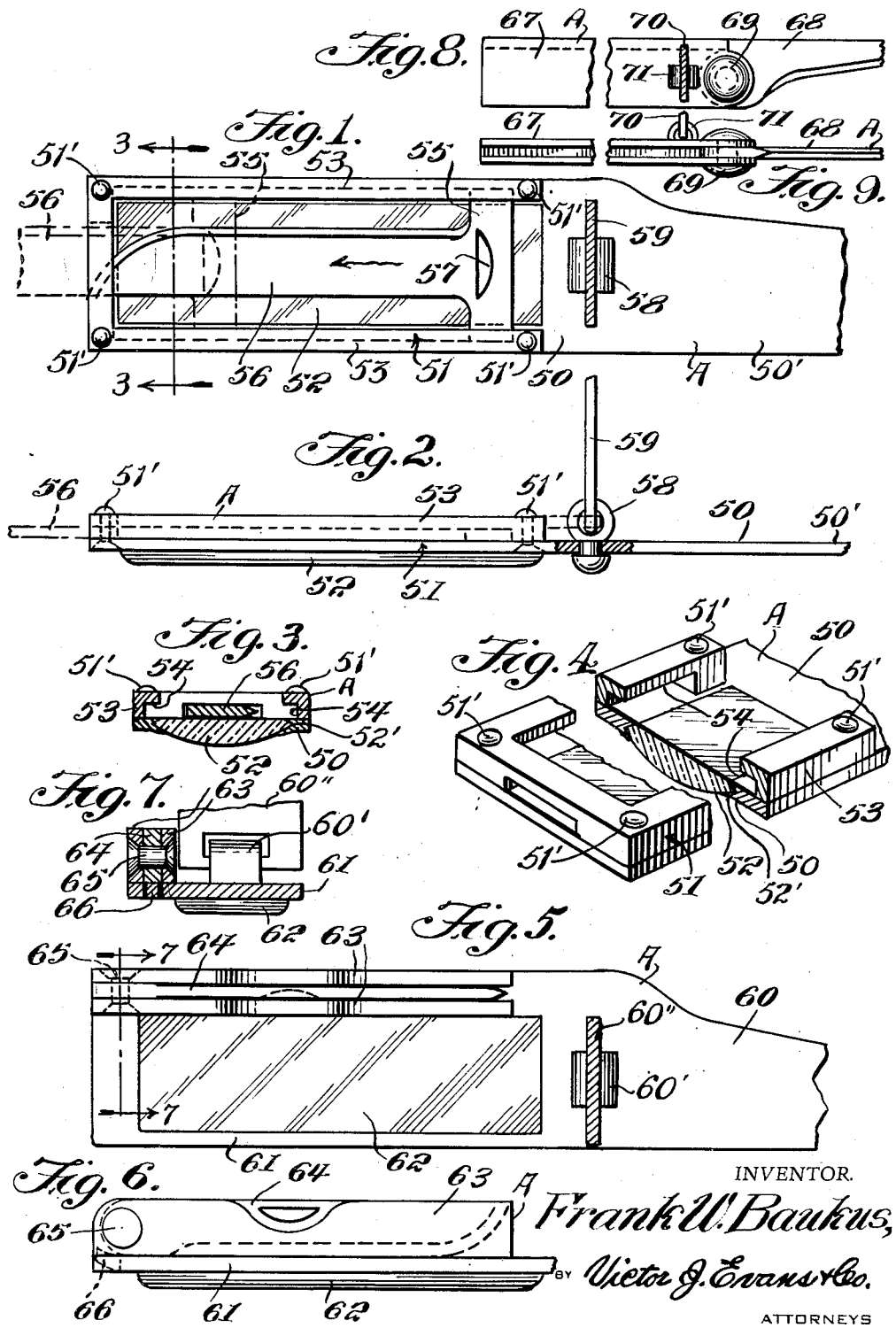
Feb. 20, 1951 — F. W. BAUKUS — 2,542,460
CUTTER AND HOUSING WITH MAGNIFYING GLASS
Original Filed June 29, 1945
INVENTOR.
Frank W. Baukus,
BY Victor J. Evans & Co.
ATTORNEYS Patented Feb. 20, 1951

UNITED STATES PATENT OFFICE 2,542,460

CUTTER AND HOUSING WITH MAGNIFYING GLASS

Frank W. Baukus, Saginaw, Mich.

Original application June 29, 1945, Serial No. 602,300. Divided and this application October 27, 1948, Serial No. 56,898

1 Claim. (Cl. 7—14.1)

The invention relates to a home or office gadget, and more especially an office device or implement for many uses, for example, a binder holder, letter opener, paper weight, magnifying glass, line follower, rule, paper cutter, sheet holder, etc., and is a divisional application of my pending application for office implement filed June 29, 1945, Serial No. 602,300, now Patent No. 2,478,175.

The primary object of the invention is the provision of a device or implement of this character, wherein on associating it with a temporary book-binder, the latter will be prevented from closing, and the pages selected for reading, or otherwise, will be held open, and the line of typed or written matter appearing can be accurately followed, and such matter can be magnified by a magnifying glass forming a part of the device or implement, the said device or implement being convertible to a letter opener, paper weight, rule, paper cutter or other handy medium for services in an office, through selectivity and adjustment therefor.

Another object of the invention is the provision of a device or implement of this character, wherein the construction thereof is novel and unique in the arrangement, so that it will be ready for use, and is entirely devoid of complicated parts, thus enabling the handling thereof with dispatch.

A further object of the invention is the provision of a device or implement of this character, wherein the construction thereof is novel and unique in the arrangement, so that it will be ready for use, and is entirely devoid of complicated parts, thus enabling the handling with dispatch.

A further object of the invention is the provision of a device or implement of this character, which is simple in construction, thoroughly reliable and efficient for universal services, strong, durable, neat in appearance, readily and easily adjusted, conveniently handled, satisfying a wide range of requirements thereof, and inexpensive to manufacture.

With these and other objects in view, the invention consists in the features of construction, combination and arrangement of parts as will be hereinafter set forth in detail, illustrated in the accompanying drawings, which disclose the preferred and modified forms of construction thereof, and pointed out in the claim hereunto appended.

In the accompanying drawings:

Figure 1 is a fragmentary plan view of an embodiment of the invention;

Figure 2 is a longitudinal edge view thereof;

Figure 3 is a transverse sectional view taken on the line 3—3 of Figure 1 looking in the direction of the arrows;

Figure 4 is a fragmentary perspective view of the rear end of the invention as disclosed in Figure 1;

Figure 5 is a fragmentary plan view of a modified form of the invention;

Figure 6 is a longitudinal edge view thereof;

Figure 7 is a sectional view taken on the line 7—7 of Figure 5 looking in the direction of the arrows;

Figure 8 is a fragmentary plan view of a further modification of the invention; and Figure 9 is a longitudinal edge view thereof.

Similar reference characters indicate corresponding parts throughout the several views in the drawings.

Referring more in detail to the drawing, the device or implement A constituting the present invention comprises a flat elongated body member 50, which may be made of any suitable material, such as, plastic material, hard rubber, metal, wood, or a combination of materials, having a required length, width, and thickness. One end portion 50' of such member is outwardly tapered, so that this portion can be utilized as a letter-opener if desired.

Secured to the rear end of the body member 50 by rivets 51' is a U-shaped window frame 51 and the opposed side portions 53 of which form a guideway 54 for a runner head slide 55 of a shiftable knife blade 56, the runner head or slide 55 is provided with a finger nail notch 57 which is exposed so that such blade may be moved outwardly of the frame or within the frame, the blade movement being best seen in Figures 1 and 2 of the drawing by full and dotted line positions respectfully.

To the member 50 inwardly of and next to the frame 51 there is connected by a riveted eye 58, a swinging leg 59 only a portion of the same being indicated in the figure and this leg is identical to the leg 18 embodied in my copending application above mentioned.

By observing Figures 3 and 4 it will be seen that a magnifying glass 52 is retained within the groove 52' in the body member 50 within the frame 51 so that when the knife blade 56 is moved outwardly of the window framing 51 the magnifying glass is available for use for the magnifying of writing when said magnifying glass is placed upon the writing.

In Figures 5 to 7 inclusive of the drawing there is shown a modification of the invention wherein the body member 60 of the implement A is framed at 61 about the magnifying glass 62 while at one side of the latter is built thereon a knife casement 63 for a knife blade 64 which is connected by a pivot 65 for the folding and unfolding thereof. Casement 63 being parallel with the longitudinal extent of the lay of the glass 62. This knife is acted upon by a spring member 66 as is common in pocket knives. This form of the invention is provided with a hooked eye 60' to which is connected the swinging blades 60" and this blade is similar in detail to the leg disclosed in my copending application mentioned above.

In Figures 8 and 9 of the drawing there is shown an additional modification of the invention wherein the rear portion of the body member forms a knife blade handle 67 in which is housed a swingable knife blade 68 on the pivot 69 for the reception within the handle when the blade is folded or extended out of the same for use. The handle 67 carries the leg 70 which is connected by an eye 71 at one side face of the handle and the leg being identical to the leg previously described in my copending application.

The device or implement in its preferred or modified forms of construction can be used for many purposes which would be obvious, it being usable for a bookbinder, and tape holder, a letter opener or paper weight, a magnifying glass or a line follower, as well as a paper cutter and the knife is available for use for the cutting of envelopes that are not opened by the use of the tapered end portion of the body.

It is believed that the construction of the various forms of the invention will be understood by anyone skilled in the art as well as the use to which they may be adapted and it is to be understood that any minor changes made in the construction of the invention are permissible provided such changes fall within the scope of the appended claim and the spirit of the invention.

Having thus described the invention, what is claimed is new and desired to be secured by Letters Patent is:

In an implement of the kind described having a flat elongated body member provided with a handle portion at one end thereof, the improvement comprising a housing for a cutting instrument mounted on said handle portion and a cutting instrument mounted in the housing, a magnifying glass forming one side of said housing and said housing being mounted on said handle portion so that the side of the housing forming the magnifying glass can be placed upon a line of writing for the magnifying thereof.

FRANK W. BAUKUS.

REFERENCES CITED

The following references are of record in the file of this patent:

UNITED STATES PATENTS

| Number | Name | Date |
|---|---|---|
| 330,557 | Brown | Nov. 17, 1885 |
| 883,648 | Landers | Mar. 31, 1908 |
| 1,840,135 | Schutt | Jan. 5, 1932 |
| 2,319,436 | Bailie | May 18, 1943 |